(12) United States Patent
Shindo et al.

(10) Patent No.: US 10,456,996 B2
(45) Date of Patent: Oct. 29, 2019

(54) TANK MANUFACTURING METHOD AND TANK

(71) Applicant: TOYOTA JIDOSHA KABUSHIKI KAISHA, Toyota-shi, Aichi-ken (JP)

(72) Inventors: Tatsunori Shindo, Toyota (JP); Kazunobu Ishibashi, Toyota (JP); Yoshihiro Iwano, Toyota (JP); Takashi Inoh, Toyota (JP); Kiyoshi Uzawa, Nonoichi (JP); Yuji Kageyama, Nonoichi (JP); Mami Sakaguchi, Nonoichi (JP); Manato Kanesaki, Nonoichi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/350,589

(22) Filed: Nov. 14, 2016

(65) Prior Publication Data
US 2017/0136716 A1 May 18, 2017

(30) Foreign Application Priority Data

Nov. 18, 2015 (JP) .................................. 2015-225307

(51) Int. Cl.
*B29C 70/32* (2006.01)
*F17C 1/06* (2006.01)
*B29D 22/00* (2006.01)
(Continued)

(52) U.S. Cl.
CPC ............ *B29C 70/32* (2013.01); *B29C 53/562* (2013.01); *B29C 70/86* (2013.01); *B29D 22/003* (2013.01); *F17C 1/06* (2013.01); *B29K 2077/00* (2013.01); *B29K 2105/0872* (2013.01); *B29K 2307/04* (2013.01); *B29L 2031/7126* (2013.01); *B29L 2031/7154* (2013.01); *F17C 2201/0109* (2013.01); *F17C 2203/0668* (2013.01);
(Continued)

(58) Field of Classification Search
CPC ....................................................... B29C 70/32
See application file for complete search history.

(56) References Cited

U.S. PATENT DOCUMENTS

| | | | | |
|---|---|---|---|---|
| 4,938,824 A | * | 7/1990 | Youngkeit | B29C 53/566 156/173 |
| 4,990,213 A | * | 2/1991 | Brown | B29C 70/32 156/322 |

(Continued)

FOREIGN PATENT DOCUMENTS

| | | |
|---|---|---|
| EP | 0463611 A2 * | 1/1992 |
| EP | 0 569 928 A1 | 11/1993 |

(Continued)

*Primary Examiner* — Jeffry H Aftergut
(74) *Attorney, Agent, or Firm* — Sughrue Mion, PLLC

(57) ABSTRACT

A manufacturing method of a tank including a tubular body portion, and dome-shaped side end portions formed on both sides of the body portion, the manufacturing method includes forming a tubular compact serving as at least part of the body portion from one fiber reinforced resin sheet by winding the fiber reinforced resin sheet including reinforced fibers impregnated with thermoplastic resin is wound several times around a peripheral surface of a core from a direction perpendicular to an axial center of the core in a state where the thermoplastic resin is melted.

4 Claims, 8 Drawing Sheets

(51) Int. Cl.
*B29C 53/56* (2006.01)
*B29C 70/86* (2006.01)
*B29K 77/00* (2006.01)
*B29K 105/08* (2006.01)
*B29K 307/04* (2006.01)
*B29L 31/00* (2006.01)

(52) U.S. Cl.
CPC .......................... *F17C 2209/2154* (2013.01); *F17C 2221/033* (2013.01); *F17C 2260/013* (2013.01); *F17C 2270/0168* (2013.01); *F17C 2270/0184* (2013.01)

(56) References Cited

U.S. PATENT DOCUMENTS

| | | | | |
|---|---|---|---|---|
| 5,256,230 | A * | 10/1993 | Winkel | B29C 53/845 156/169 |
| H1261 | H * | 12/1993 | Gibson et al. | 156/169 |
| 6,613,258 | B1 * | 9/2003 | Maison | B29C 65/7882 264/102 |
| 8,602,250 | B2 * | 12/2013 | Berger | F17C 1/06 220/586 |
| 2003/0111473 | A1 * | 6/2003 | Carter | F17C 1/06 220/586 |
| 2010/0276434 | A1 | 11/2010 | Berger et al. | |
| 2016/0354970 | A1 | 12/2016 | Taki | |

FOREIGN PATENT DOCUMENTS

| | | | |
|---|---|---|---|
| EP | 1359352 A1 | * | 11/2003 |
| EP | 2000288 A1 | * | 12/2008 |
| JP | 10220691 A | | 8/1998 |
| JP | 2005-214271 A | | 8/2005 |
| JP | 2010-125826 A | | 6/2010 |
| JP | 2016223569 A | | 12/2016 |

* cited by examiner

COMPARATIVE EXAMPLE

TANK MANUFACTURING METHOD AND TANK

CROSS REFERENCE TO RELATED APPLICATIONS

The application claims priority from Japanese Patent Application No. 2015-225307 filed on Nov. 18, 2015, and incorporates by reference the entirety of the disclosure, including the specification, drawings and abstract.

BACKGROUND

1. Field

Exemplary embodiments relate to a manufacturing method of a tank for storing gas or the like, and the tank.

2. Description of Related Art

A natural gas vehicle, a fuel-cell vehicle, or the like, for example, uses a tank for storing fuel gas. In order to achieve a weight reduction and a high strength, such a type of tank is configured such that a liner following a shape of the tank is covered with a fiber reinforced resin material.

As a manufacturing method for such a tank, Japanese Patent Application Publication No. 2010-125826 (JP 2010-125826 A), for example, proposes a method for manufacturing a tank by a filament winding method. Herein, as a fiber reinforced resin material for covering a liner, narrow fiber reinforced resin in which filaments of reinforced fibers are impregnated with thermosetting resin is used. In this method, the narrow fiber reinforced resin is wound several times in an overlapping manner around the liner constituting at least part of a body portion of the tank, so as to form a fiber reinforced resin layer on a surface of the liner. After that, the thermosetting resin contained in the fiber reinforced resin is heated so as to be hardened.

SUMMARY

However, in a case where the tank is manufactured by the filament winding method described above, it takes much time for the winding because the narrow fiber reinforced resin is wound around the liner (a core) in an overlapping manner. Further, after the fiber reinforced resin is wound, the tank is put into a heating furnace to heat and harden the thermosetting resin contained in the fiber reinforced resin, which requires more time.

Further, as described above, a plurality of fiber reinforced resin layers in which the narrow fiber reinforced resin is provided in an overlapping manner is formed in a thickness direction. As a result, every section perpendicular to an axial center of the body portion of the tank has a different winding state of the fiber reinforced resin, so it is assumed that variations in tank strength might occur.

Further, when a fiber reinforced resin tape is wound around the core so that the narrow fiber reinforced resin is provided in an overlapping manner, irregularities are formed on its surface. When the fiber reinforced resin is further wound around the surface on which the irregularities are formed, a gap is easily formed between the fiber reinforced resin layers adjacent to each other in the thickness direction. The gap may cause a void in the body portion of the tank after the thermosetting resin is hardened, which may decrease the tank strength.

Exemplary embodiments describe a tank having a uniform strength in a body portion and also provide a tank manufacturing method that can manufacture the tank in a short time.

A first aspect of the exemplary embodiments relate to a manufacturing method of a tank including a tubular body portion, and dome-shaped side end portions formed on both sides of the body portion. The manufacturing method of the tank includes forming a tubular compact serving as at least part of the body portion from one fiber reinforced resin sheet by winding the fiber reinforced resin sheet including reinforced fibers impregnated with thermoplastic resin several times around a peripheral surface of a core from a direction perpendicular to an axial center of the core in a state where the thermoplastic resin is melted.

According to the first aspect, in comparison with the narrow fiber reinforced resin as described in JP 2010-125826 A, one wide fiber reinforced resin sheet can be wound around the peripheral surface of the core so as to be continuously wound several times around the axial center of the core on the section. Hereby, in comparison with a case where the narrow fiber reinforced resin is wound around the core as described in JP 2010-125826 A, it is possible to form the tubular compact in a short time.

Particularly, unlike a surface of a fiber reinforced resin layer obtained by winding the narrow fiber reinforced resin in an overlapping manner, no irregularities are formed on a surface of the fiber reinforced resin sheet wound around the core. Accordingly, even if the fiber reinforced resin sheet is further continuously wound thereon, a gap can be hardly formed between the fiber reinforced resin sheets. This makes it possible to restrain a void from being formed in the tubular compact.

Further, the fiber reinforced resin layer of the tubular compact made of one fiber reinforced resin sheet is formed over both sides of the body portion, and is continuously wound several times around the axial center of the body portion. This allows the body portion of the tank to have a more uniform compressive strength on any section perpendicular to the axial center.

Further, the resin with which the reinforced fibers are impregnated is thermoplastic resin. Accordingly, it is not necessary to perform heating for the purpose of hardening like thermosetting resin. Hereby, as compared with a case of using thermosetting resin, it is possible to manufacture the tubular compact in a short time.

A fiber reinforced resin sheet in which the reinforced fibers are arranged along one direction may be used as the fiber reinforced resin sheet, and when the tubular compact is formed, the fiber reinforced resin sheet may be wound around the peripheral surface of the core so that the reinforced fibers are wound several times on a section perpendicular to the axial center of the core.

With such a configuration, the reinforced fibers continuously wound several times in a direction where a hoop tension acts on the body portion by an internal-pressure of the tank (that is, a direction perpendicular to the axial center) are provided in the body portion of the tank thus manufactured. This makes it possible to obtain a tank having a high compressive strength. This further makes it possible to achieve a reduction in thickness of the body portion of the tank, thereby making it possible to achieve a weight reduction of the tank and a cost reduction.

After the tubular compact is formed, the tubular compact may be pulled out from the core, so as to manufacture a body corresponding to the body portion. With such a configuration, by pulling out the tubular compact from the core, it is possible to obtain a body constituted by a tubular compact that does not include a liner.

The manufacturing method of the tank may further include forming the side end portions in the tank by heating at least one of dome-shaped side end members and the tubular compact such that the side end members are fused to the tubular compact, the side end members containing the thermoplastic resin as a main material.

With such a configuration, when the side end members are fused to the tubular compact, the side end members can be integrated with the tubular compact constituting at least part of the body portion, thereby making it possible to secure compressive strength at boundaries between the body portion and the side end portions.

A second aspect according to the exemplary embodiments relates to a tank including a tubular body portion, and dome-shaped side end portions provided on both sides of the body portion. The tubular body portion includes a tubular compact portion constituted by a sheet-shaped fiber reinforced resin layer in which reinforced fibers are impregnated with thermoplastic resin, and the fiber reinforced resin layer is provided over both sides of the body portion, and the fiber reinforced resin layer is wound several times in a direction perpendicular to an axial center of the body portion.

According to the second aspect, the fiber reinforced resin layer of a tubular compact is provided over both sides of the body portion, and the fiber reinforced resin layer is continuously wound several times around the axial center of the body portion in a direction perpendicular to the axial center. This allows the body portion of the tank to have a more uniform pressure resistance on its section perpendicular to the axial center.

The reinforced fibers may be arranged along a circumferential direction of the body portion, and the reinforced fibers may be wound several times on a section perpendicular to the axial center of the body portion. With such a configuration, the reinforced fibers are continuously wound several times around the body portion of the tank in a direction where a hoop tension acts on the body portion due to an internal-pressure of the tank, thereby making it possible to increase compressive strength of the tank.

An accommodation space of the tank may be provided in the tubular compact portion. With such a configuration, a liner does not need to be provided in the body portion of the tank. This makes it possible to achieve a weight reduction of the tank, so that the tank can be manufactured at a low cost.

The side end portions may contain thermoplastic resin as a main material, and the side end portions may be joined to the tubular compact portion. With such a configuration, since the tubular compact and the side end portions, both containing thermoplastic resin, are joined to each other, thereby making it possible to secure compressive strength at boundaries therebetween.

According to the exemplary embodiments, it is possible to obtain a tank having a uniform strength in a body portion and also to manufacture the tank in a short time.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF THE EXEMPLARY EMBODIMENTS

The following describes a tank and its manufacturing method according to the exemplary embodiments with reference to the drawings.

First Embodiment

1. Tank 1

Figure 1A:
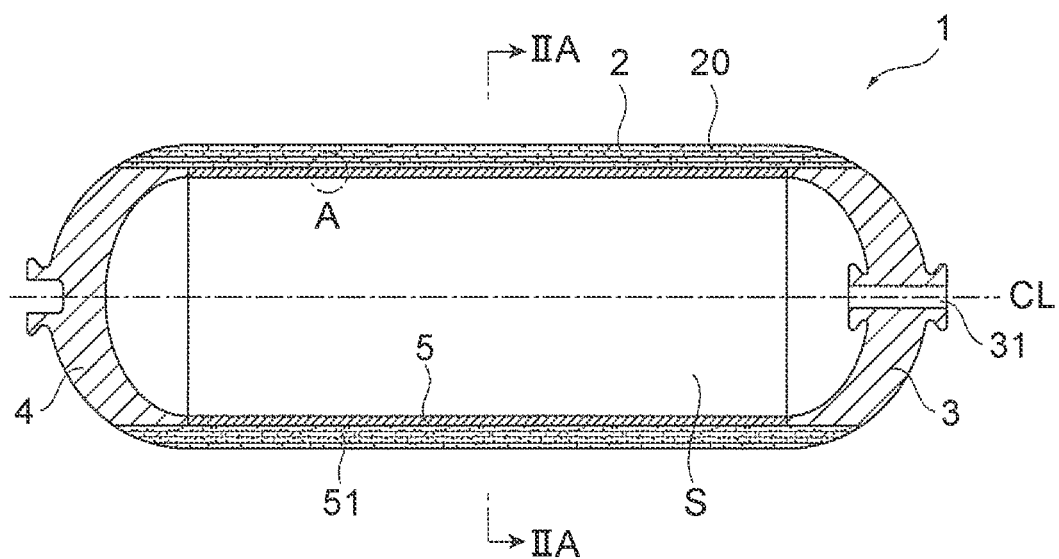
FIG. 1A is a schematic sectional view of a tank according to a first embodiment.
Figure 1B:
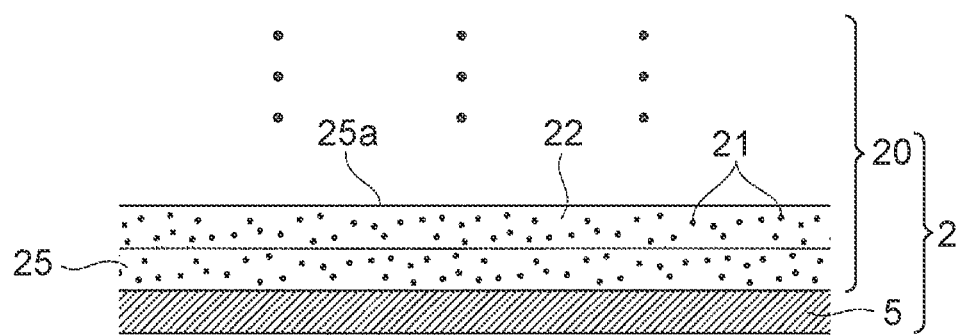
FIG. 1B is an enlarged view of a part A in FIG. 1A.
Figure 2A:
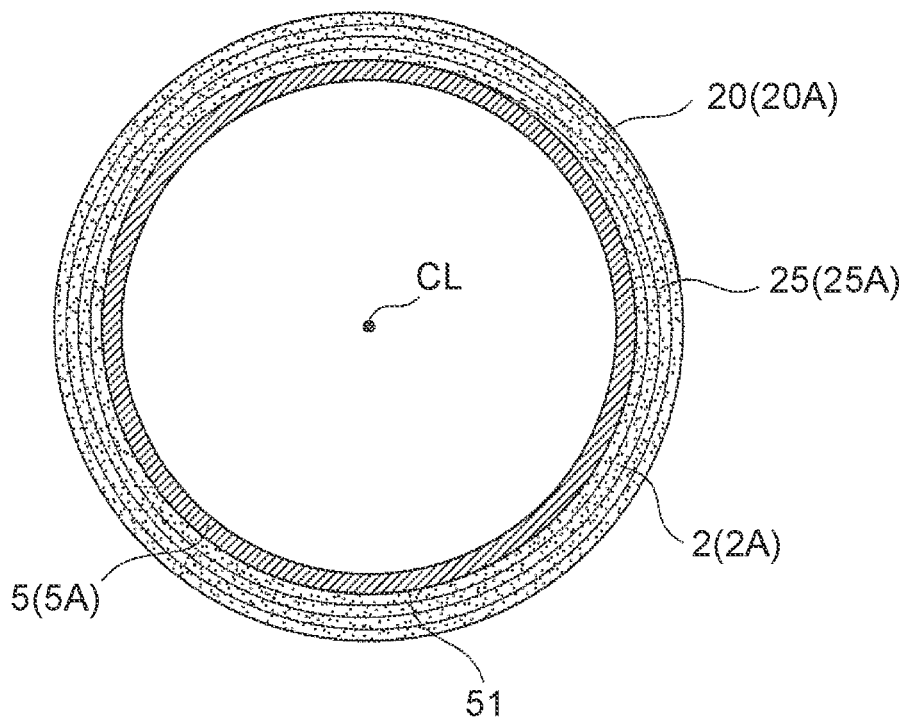
FIG. 2A is a sectional view of the tank taken along an arrow IIA-IIA in FIG. 1A.
Figure 2B:
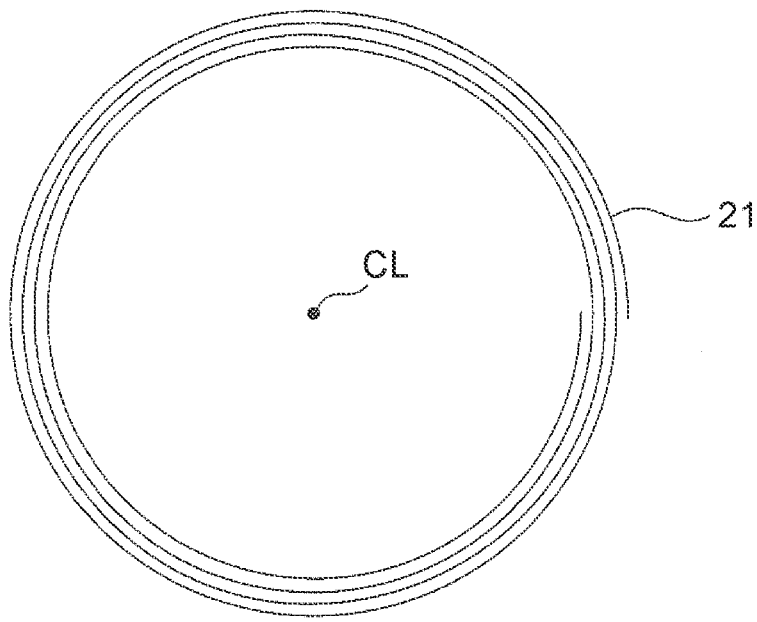
FIG. 2B is a schematic conception diagram illustrating a state of reinforced fiber in the sectional view illustrated in FIG. 2A.

First described is a tank according to a first embodiment with reference to FIGS. 1A, 1B and FIGS. 2A, 2B. FIG. 1A is a schematic sectional view of a tank 1 according to the first embodiment, and FIG. 1B is an enlarged view of a part A in FIG. 1A. FIG. 2A is a sectional view of the tank 1 taken along an arrow IIA-IIA in FIG. 1A, and FIG. 2B is a schematic conception diagram illustrating a state of reinforced fiber in the sectional view illustrated in FIG. 2A. Note that the sectional view of FIG. 2A taken along the arrow IIA-IIA illustrates a section perpendicular to an axial center CL of the tank 1.

As illustrated in FIG. 1A, the tank 1 according to the present embodiment includes a cylindrical body portion 2, and dome-shaped side end portions 3, 4 formed on both sides of the body portion 2. An accommodation space S in which to accommodate (fill) high-pressure hydrogen gas at about 70 MPa, for example, is formed inside the tank 1. A through-hole 31 through which hydrogen gas is filled into the accommodation space S of the tank 1 is formed in the side end portion 3 on one side.

The side end portions 3, 4 have a dome shape and are formed so as to be reduced in diameter as it goes outward from both sides of the body portion 2 along an axial-center direction of the body portion 2. In the present embodiment, the side end portions 3, 4 contain thermoplastic resin as a main material, and the side end portions 3, 4 are join to the after-mentioned fiber reinforced resin layer 25 (a tubular compact portion 20) containing thermoplastic resin.

Hereby, the tubular compact portion 20 and the side end portions 3, 4, which both contain thermoplastic resin, are joined to each other, thereby making it possible to secure compressive strength at boundaries therebetween. Further, by heating the side end portion 3 containing thermoplastic resin as a main material, the side end portion 3 can be deformed into a shape fitted to a mounting part or the like of the tank, and in addition, a sectional shape and an aperture of the through-hole 31 can be easily changed. Furthermore, in a case where high-pressure hydrogen gas is stored in the tank 1, for example, permeability of hydrogen gas can be restrained in comparison with a case where the side end portions 3, 4 are made of thermosetting resin.

Here, the wording "containing thermoplastic resin as a main material" in the present specification includes both a case of "being made of thermoplastic resin" and a case of "containing short fibers, fillers, and the like in thermoplastic resin." Note that in order to form the through-hole 31 of the side end portion 3, a metal mouth piece made of aluminum or stainless steel, for example, may be further provided in the side end portion 3.

The body portion 2 includes a liner 5 that forms part of the accommodation space S, and the tubular compact portion 20 formed along a peripheral surface 51 of the cylindrical liner 5. A material of the liner 5 is not limited to metal, resin, and the like in particular, provided that the liner 5 serves as a core for forming the tubular compact portion 20 along the peripheral surface 51. In the present embodiment, the liner 5 is a compact containing thermoplastic resin as a main material.

As illustrated in FIG. 2A, the tubular compact portion 20 is formed by one continuous sheet-shaped fiber reinforced resin layer (FRP layer) 25. More specifically, the fiber reinforced resin layer 25 is formed over both sides of the body portion 2, and continuously wound several times around the axial center CL of the body portion 2 in a direction perpendicular to the axial center CL of the body portion 2. This allows the body portion 2 of the tank 1 to have a more uniform pressure resistance on its section perpendicular to the axial center CL.

Here, the fiber reinforced resin layer 25 is a sheet-shaped layer in which reinforced fibers are impregnated with thermoplastic resin. The reinforced fiber may be a short fiber, a long fiber, a continuous fiber (continuous reinforcement fiber), or a cloth fiber, but in the present embodiment, the reinforced fiber is a continuous reinforcement fiber.

More specifically, reinforced fibers 21 are continuous reinforcement fibers arranged along a circumferential direction of the body portion 2, and the reinforced fibers 21 are oriented in the direction perpendicular to the axial center CL of the body portion 2. More specifically, as illustrated in FIG. 2B, the reinforced fibers 21 are continuously wound several times around the axial center CL of the body portion 2 on the section perpendicular to the axial center CL of the body portion 2. That is, a winding direction of the reinforced fibers 21 is the same as a winding direction of the fiber reinforced resin layer 25.

Hereby, the reinforced fibers 21 are continuously wound several times around the body portion 2 of the tank 1 in a direction where a hoop tension acts on the body portion 2 due to an internal-pressure of the tank 1. This makes it possible to achieve a weight reduction and a cost reduction due to thinning of the body portion 2 of the tank 1.

Here, the reinforced fiber 21 may be, for example, a fiber such as a glass fiber, a carbon fiber, an aramid fiber, an alumina fiber, a boron fiber, a steel fiber, a PBO fiber, a natural fiber, or a high-strength polyethylene fiber. In the present embodiment, the carbon fiber is used as the reinforced fiber.

The thermoplastic resin contained in the side end portions 3, 4, the liner 5, and the fiber reinforced resin layer 25 may be, for example, a polyester resin, a polypropylene resin, a nylon resin (e.g., 6-nylon resin or 6,6-nylon resin), a polyamide resin, an epoxy resin, a polycarbonate resin, an acrylic resin, an ABS resin, or the like. The side end portions 3, 4, the liner 5, and the fiber reinforced resin layer 25 may contain the same type of resin among the above resins, as the thermoplastic resin. Further, in a case where high-pressure hydrogen gas is stored in the tank 1, the polyester resin, the polypropylene resin, the nylon resin, or the like among the above resins can be used as thermoplastic resin that more preferably restrains permeation of the hydrogen gas.

2. Manufacturing Method of Tank 1

Figure 3:
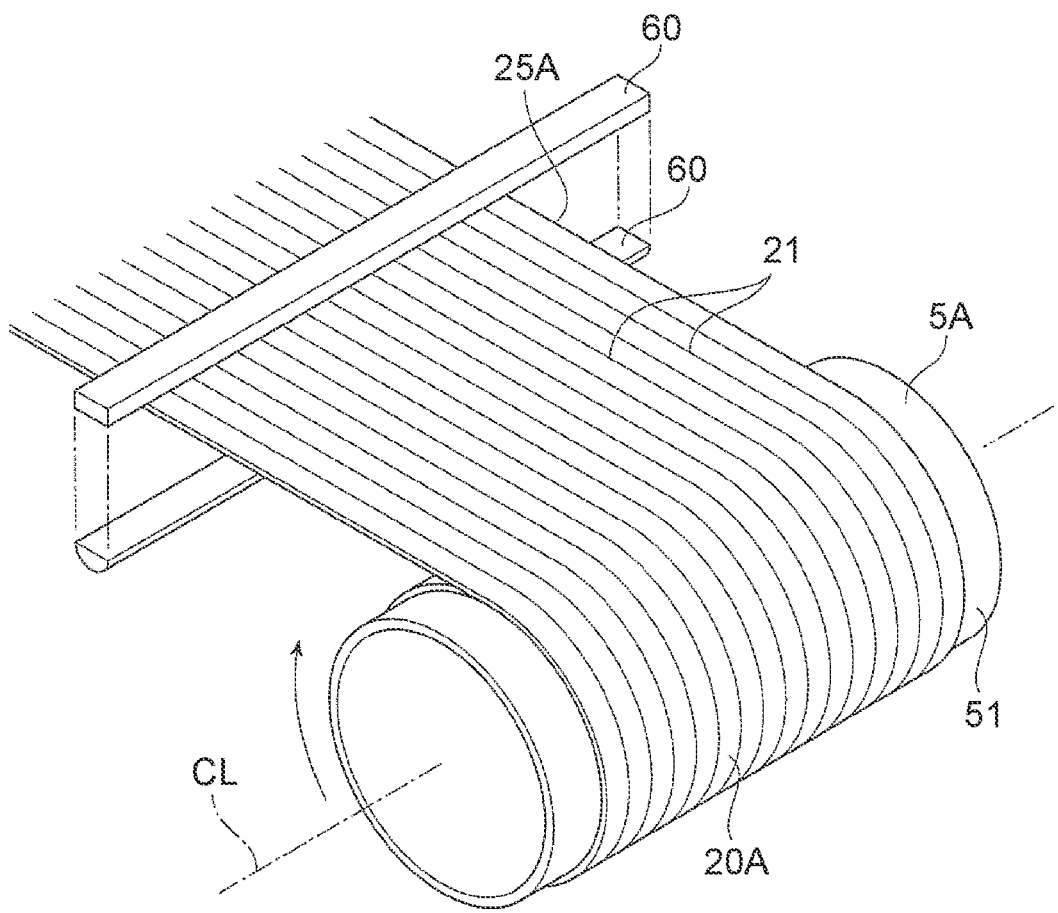
FIG. 3 is a schematic perspective view to describe part of a manufacturing method of the tank illustrated in FIG. 1A.
Figure 4A:
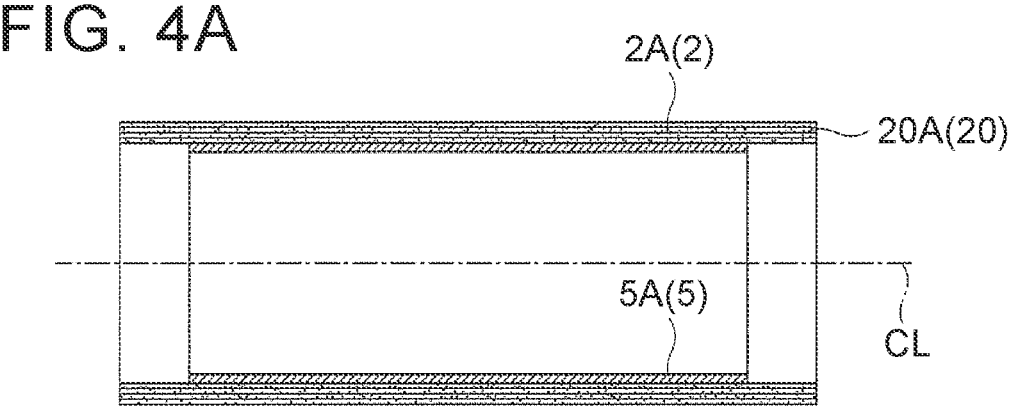
FIG. 4A is a schematic sectional view to describe the manufacturing method of the tank illustrated in FIG. 1A.
Figure 4B:
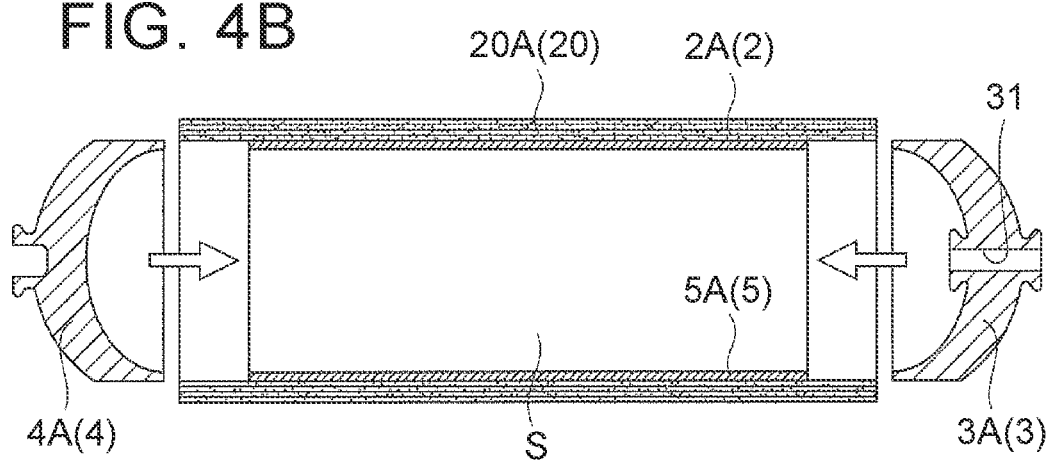
FIG. 4B is a schematic sectional view to describe the manufacturing method of the tank illustrated in FIG. 1A.
Figure 4C:
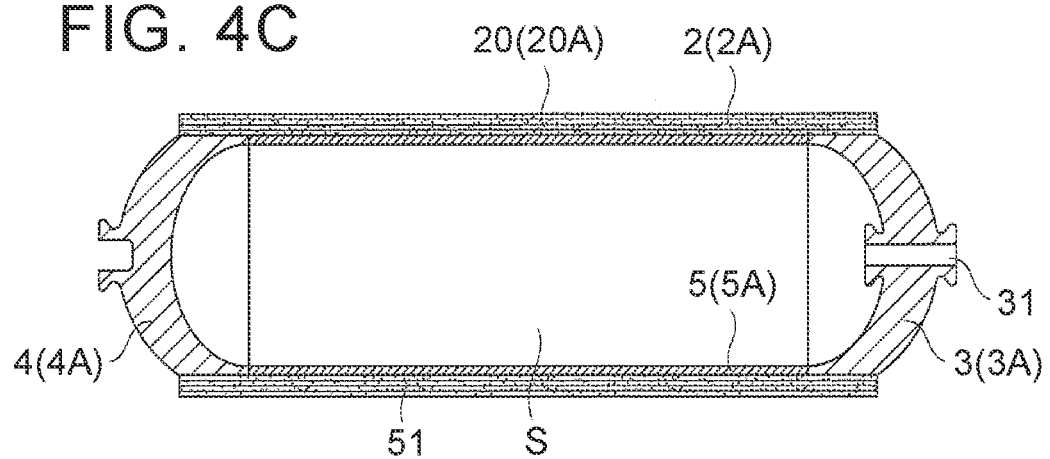
FIG. 4C is a schematic sectional view to describe the manufacturing method of the tank illustrated in FIG. 1A.
Figure 5A:
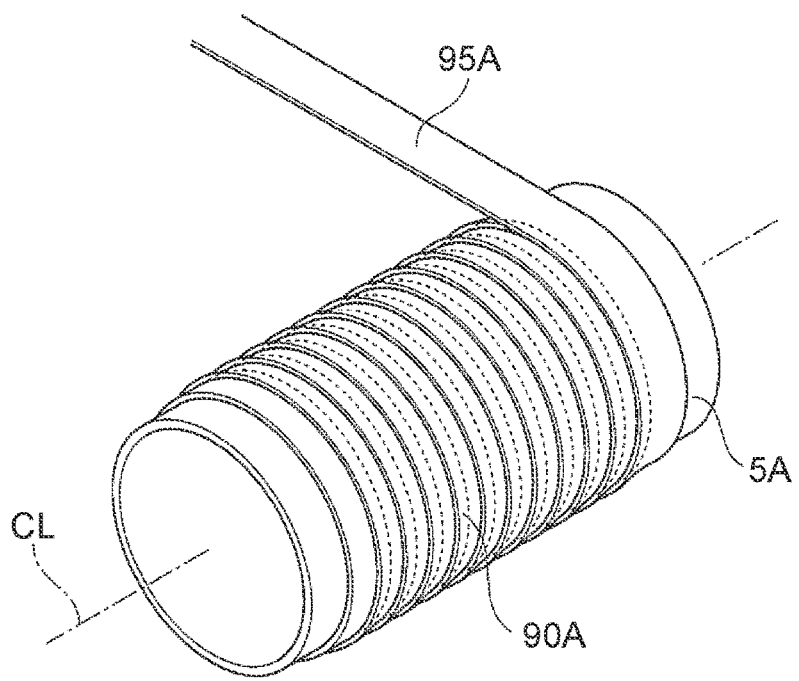
FIG. 5A is a schematic perspective view to describe part of a manufacturing method of a tank in the related art.
Figure 5B:
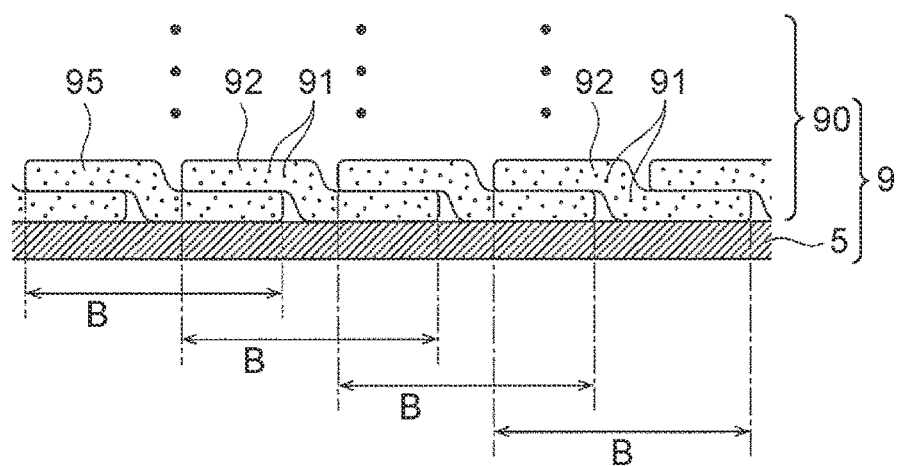
FIG. 5B is a partial enlarged sectional view of a body portion of the tank in the related art.

The following describes a manufacturing method (a sheet winding method) of the tank 1 in comparison with a method (a filament winding method) in the related art. FIG. 3 is a schematic perspective view to describe part of the manufacturing method of the tank 1 illustrated in FIG. 1A. FIGS. 4A to 4C are schematic sectional views to describe the manufacturing method of the tank 1 illustrated in FIG. 1A. FIG. 5A is a schematic perspective view to describe part of a manufacturing method of a tank in the related art, and FIG. 5B is a partial enlarged sectional view of a body portion of the tank in the related art.

First, as illustrated in FIG. 3, a cylindrical core 5A corresponding to the liner 5 of the tank 1 is prepared, and the core 5A is passed through a columnar winding machine (not shown) so as to be fitted thereto such that the core 5A rotates integrally with the winding machine. Note that, in the present embodiment, the core 5A serves as a mandrel, so the winding machine rotates around the axial center CL. Then, a fiber reinforced resin sheet (FRP sheet) 25A in which reinforced fibers 21 are impregnated with thermoplastic resin is prepared. Here, a width of the fiber reinforced resin sheet 25A is equal to or larger than a length of the body portion 2.

Such a fiber reinforced resin sheet 25A may be configured such that the aforementioned cloth fiber is impregnated with thermoplastic resin, for example. However, the present embodiment uses a fiber reinforced resin sheet configured such that the reinforced fibers 21 are arranged along a longitudinal direction (one direction) of the fiber reinforced resin sheet 25A and impregnated with thermoplastic resin. Such a fiber reinforced resin sheet 25A can be obtained by opening a fiber bundle made of continuous reinforcement fibers and impregnating the continuous reinforcement fibers thus opened with molten thermoplastic resin.

Subsequently, while the core 5A is rotated with the winding machine, the fiber reinforced resin sheet 25A is wound around the peripheral surface 51 of the core 5A from the direction perpendicular to the axial center CL of the core 5A, so as to form a tubular compact 20A from one fiber reinforced resin sheet 25A by the sheet winding method. More specifically, the fiber reinforced resin sheet 25A is heated by heaters 60, 60 to a temperature of a softening point of the thermoplastic resin or higher. In a state where the thermoplastic resin in the fiber reinforced resin sheet 25A is melted, the fiber reinforced resin sheet 25A is wound several times around the peripheral surface 51 of the cylindrical core 5A. The fiber reinforced resin sheet 25A thus wound is cooled by open cooling or forced cooling, so that the thermoplastic resin is cooled down to be lower than the softening point and hardens.

More specifically, as illustrated in FIG. 2A, the fiber reinforced resin sheet 25A is wound around the peripheral surface 51 of the cylindrical core 5A, so that one fiber reinforced resin sheet 25A is continuously wound several times around the axial center CL of the core 5A on a section perpendicular to the axial center CL of the core 5A. In the present embodiment, the tubular compact 20A is formed as at least part of the body portion 2.

As described above, in the fiber reinforced resin sheet 25A, the reinforced fibers 21 are arranged along the longitudinal direction (one direction) of the fiber reinforced resin sheet 25A, and each of the reinforced fibers 21 is perpendicular to a width direction of the fiber reinforced resin sheet 25A. Particularly, in the present embodiment, the width direction of the fiber reinforced resin sheet 25A is set to the same direction as a lengthwise direction of the core 5A, and the fiber reinforced resin sheet 25A is wound around the peripheral surface 51 of the core 5A.

This allows the reinforced fibers 21 to be oriented in the direction perpendicular to the axial center CL of the core 5A. That is, as illustrated in FIG. 2B, the fiber reinforced resin sheet 25A can be wound around the peripheral surface 51 of the core 5A so that the reinforced fibers 21 are continuously wound around the axial center CL of the core 5A several times on the section perpendicular to the axial center CL of the core 5A. Note that the axial center of the core 5A is the same as the axial center of the body portion 2 of the tank 1.

Subsequently, the core 5A around which the fiber reinforced resin sheet 25A is wound is pulled out from the columnar winding machine. Then, in a state where the after-mentioned side end members 3A, 4A are inserted into the tubular compact 20A, the core 5A is processed as needed so that the side end members 3A, 4A can be fitted to an inner peripheral surface of the tubular compact 20A. Hereby, it is possible to obtain a body 2A corresponding to the body portion 2 of the tank 1 (see FIG. 4A).

Then, dome-shaped side end members 3A, 4A corresponding to the side end portions 3, 4 of the tank 1 are prepared (see FIG. 4B). In the present embodiment, the side end members 3A, 4A are made of the aforementioned thermoplastic resin or thermoplastic resin including short fibers or fillers.

Subsequently, at least one of the side end members 3A, 4A and the body 2A (the tubular compact 20A) is heated, and the side end members 3A, 4A are inserted into the body 2A (see FIG. 4B). Hereby, the side end members 3A, 4A are fused to the core 5A and the tubular compact 20A, so as to form the side end portions 3, 4 on both sides of the body portion 2 (that is, the tank 1) (see FIG. 4C). After that, both ends of the tubular compact 20A (the tubular compact portion 20) are deformed by machining or heating, thereby making it possible to obtain the tank 1 having the body portion 2 (the tubular compact portion 20) illustrated in FIG. 1A.

Conventionally, as illustrated in FIGS. 5A, 5B, which will be described later, a tubular compact 90A is formed by the filament winding method in which a fiber reinforced resin 95A is wound around a core 5A. The fiber reinforced resin 95A has a narrow width B and is configured such that filaments of reinforced fibers 91 are impregnated with thermosetting resin 92. More specifically, a plurality of fiber reinforced resin layers 95 is formed in a thickness direction such that the narrow fiber reinforced resin 95A is provided in an overlapping manner. Thus, the tubular compact 90A (a tubular compact portion 90) is formed.

However, in the present embodiment, in comparison with the fiber reinforced resin 95A, one wide fiber reinforced resin sheet 25A is continuously wound several times around the peripheral surface 51 of the core 5A from the direction perpendicular to the axial center CL of the core 5A by the sheet winding method. Hereby, the tubular compact 20A can be formed in a short time in comparison with a case of winding the narrow fiber reinforced resin 95A around the core 5A in an overlapping manner.

Further, in the present embodiment, the resin with which the reinforced fibers 21 are impregnated is the thermoplastic resin 22. Accordingly, it is not necessary to put the tubular compact into a heating furnace to heat the tubular compact for the purpose of hardening like thermosetting resin. Hereby, as compared with a case of using thermosetting resin, it is possible to manufacture the tubular compact 20A in a short time.

Further, conventionally, as illustrated in FIG. 5B, a gap is easily formed in a part where the narrow fiber reinforced resin 95A is provided in an overlapping manner, and further, irregularities are easily formed on a surface 95a of the fiber reinforced resin layer 95. When the narrow fiber reinforced resin 95A is further continuously wound on the surface on which the irregularities are formed so as to further form a fiber reinforced resin layer 95, a gap is easily formed between the fiber reinforced resin layers 95 adjacent to each other in the thickness direction. The gap may remain as a void in the tubular compact after thermosetting resin is hardened, which may decrease tank strength.

However, in the present embodiment, one fiber reinforced resin sheet 25A is wound around the peripheral surface 51 of the core 5A so that one fiber reinforced resin layer 25 is continuously wound several times around the axial center CL of the body portion 2.

Consequently, a surface 25a of the fiber reinforced resin layer 25 has a fewer irregularities than the surface of the fiber reinforced resin layer 95 formed by helical winding (see FIG. 1B). As a result, further, as illustrated in FIG. 3, even if one fiber reinforced resin sheet 25A is further continuously wound, a gap can be hardly formed between the fiber reinforced resin layers 25 in the thickness direction, as illustrated in FIG. 2A. This makes it possible to restrain a void from being formed in the tubular compact 20A (that is, the body portion 2 of the tank 1).

Further, conventionally, the fiber reinforced resin layers 95 formed by helical winding are intermittently wound around the axial center of the body portion on a section perpendicular to the axial center of the body portion, which causes unevenness in tank strength in a circumferential direction of the body portion.

However, in the present embodiment, as illustrated in FIGS. 1A and 2A, the fiber reinforced resin layer 25 is formed over both sides of the body portion 2 and is continuously wound several times around the axial center CL of the body portion 2 on the section perpendicular to the axial center CL of the core. Hereby, the fiber reinforced resin layer 25 has the same state on any section perpendicular to the axial center CL of the body portion 2, thereby making it possible to achieve a more uniform compressive strength.

In the present embodiment, as illustrated in FIG. 2B, in the tank 1 thus manufactured, the reinforced fibers 21 continuously wound several times are provided in a direction where a hoop tension acts on the body portion 2 by an internal-pressure of the tank. Thus, it is possible to obtain a tank having a high compressive strength.

Second Embodiment

Figure 6A:
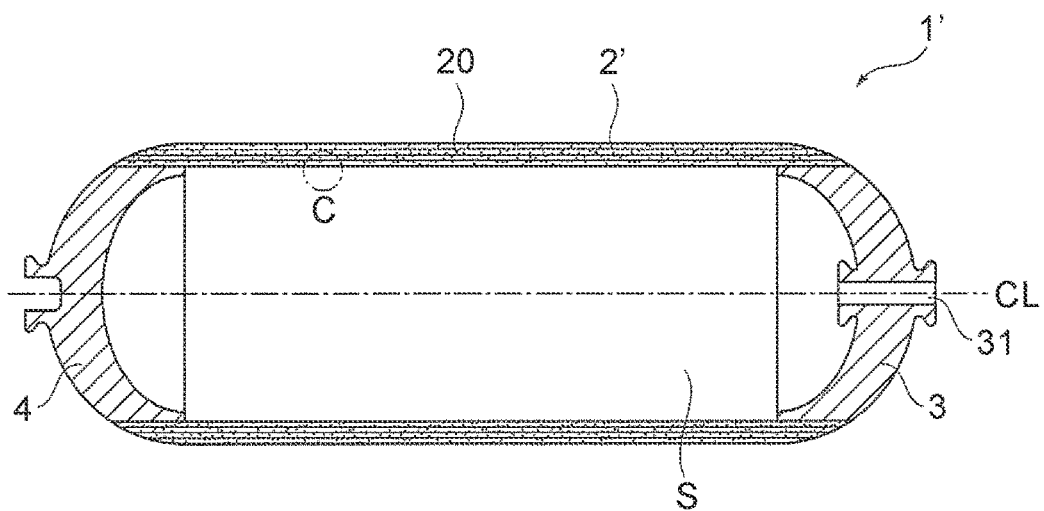
FIG. 6A is a schematic sectional view of a tank according to a second embodiment.
Figure 6B:
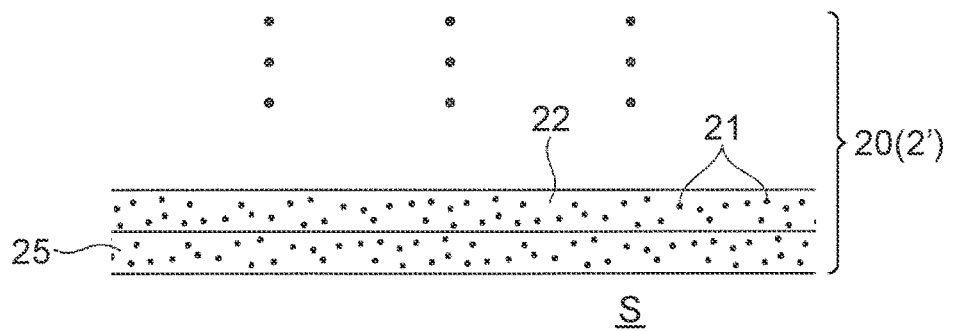
FIG. 6B is an enlarged view of a part C in FIG. 6A.
Figure 7A:
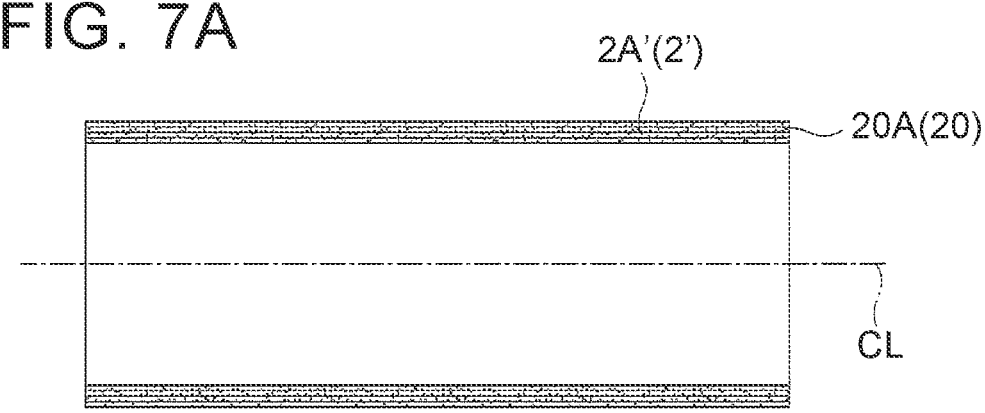
FIG. 7A is a schematic sectional view to describe a manufacturing method of the tank illustrated in FIG. 6A.
Figure 7B:
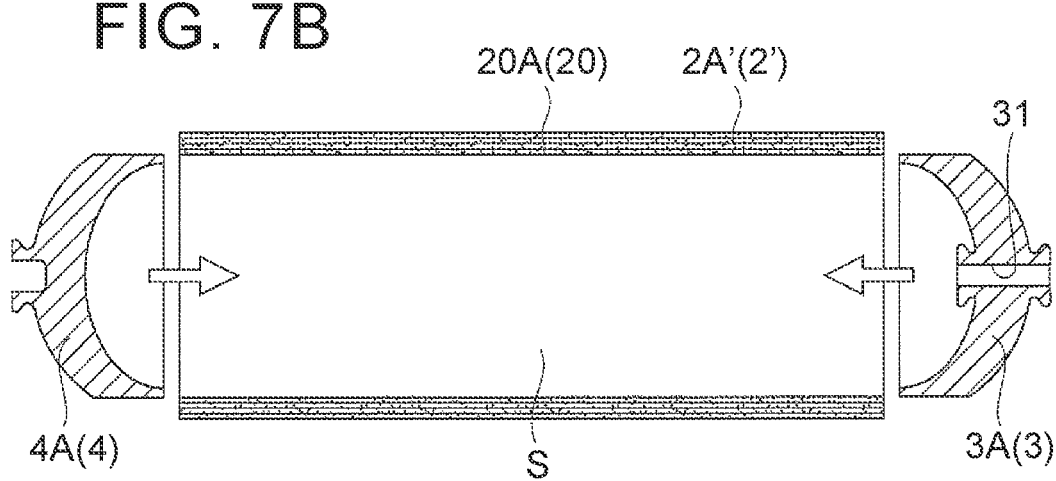
FIG. 7B is a schematic sectional view to describe the manufacturing method of the tank illustrated in FIG. 6A.
Figure 7C:
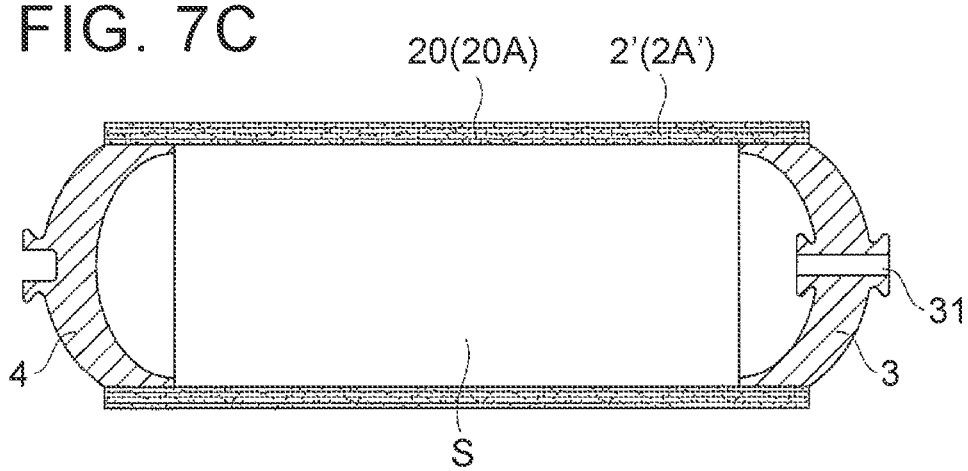
FIG. 7C is a schematic sectional view to describe the manufacturing method of the tank illustrated in FIG. 6A.

The following describes a tank 1' according to a second embodiment with reference to FIGS. 6A and 6B, and a manufacturing method of the tank 1' with reference to FIGS. 7A to 7C. FIG. 6A is a schematic sectional view of the tank 1' according to the second embodiment, and FIG. 6B is an enlarged view of a part C in FIG. 6A. FIGS. 7A to 7C are schematic sectional views to describe the manufacturing method of the tank 1' illustrated in FIG. 6A.

Note that the tank 1' according to the second embodiment is different from the tank 1 according to the first embodiment in that the liner 5 is not provided in the tank 1'. Accordingly, the same members as those in the first embodiment have the same reference signs as those in the first embodiment and detailed descriptions thereof are omitted.

In the present embodiment, a body portion 2' of the tank 1' is constituted by a tubular compact portion 20. The body portion 2' does not include the liner 5 illustrated in FIG. 1A, and an accommodation space S of the tank 1' is formed by the tubular compact portion 20. Similarly to the first embodiment, the tubular compact portion 20 is made of a sheet in which reinforced fibers 21 include thermoplastic resin 22, and similarly to the first embodiment, the tubular compact portion 20 is formed by one continuous sheet-shaped fiber reinforced resin layer 25.

In the present embodiment, the tubular compact portion 20, which is the body portion 2', is the fiber reinforced resin layer 25 using the thermoplastic resin 22. Accordingly, even if high-pressure hydrogen gas is stored in the accommodation space S of the tank 1', the tubular compact portion 20 has a gas barrier property, unlike a fiber reinforced resin layer using thermosetting resin.

That is, as illustrated in FIG. 5A and the like, conventionally, the thermosetting resin 92 is used for the fiber reinforced resin layer 95, and high-pressure hydrogen gas stored in the accommodation space of the tank easily passes through the fiber reinforced resin layer. This requires the liner 5 made of metal or thermoplastic resin.

However, in the present embodiment, the thermoplastic resin 22 is used in the fiber reinforced resin layer 25, so the tubular compact portion 20, which is the body portion 2', has a gas barrier property against hydrogen gas. Hereby, even if the liner is not provided in the body portion 2', high-pressure hydrogen gas stored in the accommodation space S of the tank 1' can hardly pass through the body portion 2'. As a result, as illustrated in the tank 1' according to the second embodiment, the liner can be omitted from the body portion 2', thereby making it possible to reduce a weight of the tank and a manufacturing cost.

Such a tank 1' can be manufactured as follows. In the first embodiment, the fiber reinforced resin sheet 25A is wound around the peripheral surface of the core 5A corresponding to the liner 5 (see FIG. 3). However, in the present embodiment, a columnar winding machine (not shown) is used as a core (a mandrel) around which the fiber reinforced resin sheet 25A is to be wound. That is, the tubular compact 20A is formed without using the core 5A illustrated in FIG. 3 by winding the fiber reinforced resin sheet 25A around the columnar winding machine (not shown) by a technique similar to the first embodiment.

Then, the tubular compact 20A thus formed is pulled out from the columnar winding machine, and thus, a body 2A' can be obtained (see FIG. 7A). Subsequently, similarly to the first embodiment, side end members 3A, 4A are prepared, and at least one of the body 2A' (the tubular compact 20A) and the side end members 3A, 4A is heated. Then, the side end members 3A, 4A are inserted into the tubular compact 20A so as to be fused to each other (see FIGS. 7B, 7C). Thus, it is possible to obtain the tank 1' having the body portion 2' (the tubular compact portion 20) illustrated in FIG. 6A.

The following describes one non-limiting exemplary embodiment with reference to an example.

Example

In the present example, a tubular compact was formed by the method (sheet winding method) described in the second embodiment. More specifically, a fiber reinforced resin sheet in which carbon fibers (reinforced fibers) were impregnated with nylon resin (thermoplastic resin) was prepared. The fiber reinforced resin sheet thus prepared had a width of 300 mm and a thickness of 40 μm. The fiber reinforced resin sheet was heated to a temperature of not less than a softening point (230° C.) of the thermoplastic resin so as to melt the thermoplastic resin. Then, the fiber reinforced resin sheet was wound around a peripheral surface of a core several times, and thus, a tubular compact was formed.

Figure 8A:
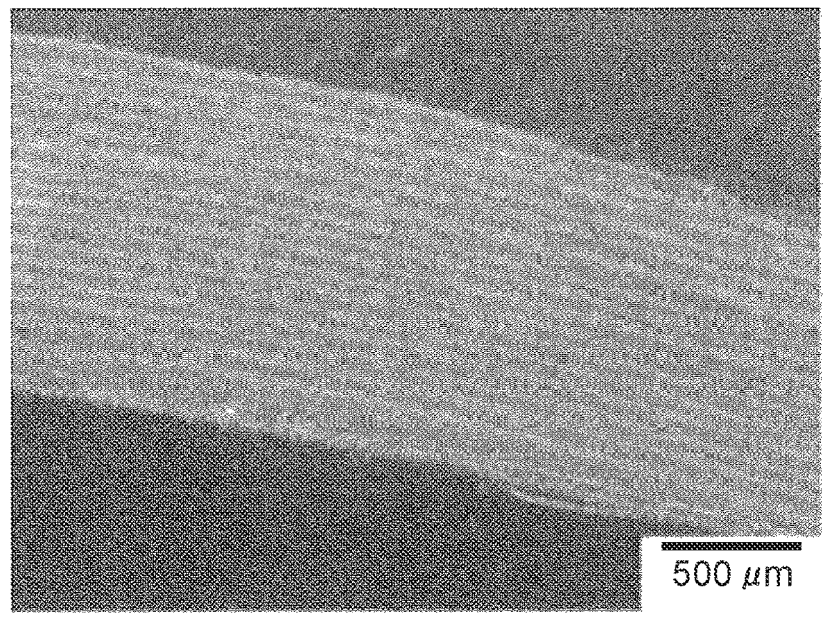
FIG. 8A is a picture of a section of a tubular compact according to an example in a direction perpendicular to an axial center.

A section of the tubular compact thus formed was observed by an optical microscope. A result thereof is shown in FIG. 8A. FIG. 8A is a picture of a section of the tubular compact according to the example in a direction perpendicular to its axial center.

Comparative Example

A tubular compact having a shape similar to the example was formed. More specifically, narrow fiber reinforced resin in which carbon fibers (reinforced fibers) were impregnated with epoxy resin (thermosetting resin) was prepared. The fiber reinforced resin sheet thus prepared had a width of 10 mm and a thickness of 240 μm. The fiber reinforced resin was wound around a core by the method (filament winding method) illustrated in FIG. 5A. After that, the epoxy resin was heated to be hardened, and thus, a tubular compact was formed.

Figure 8B:
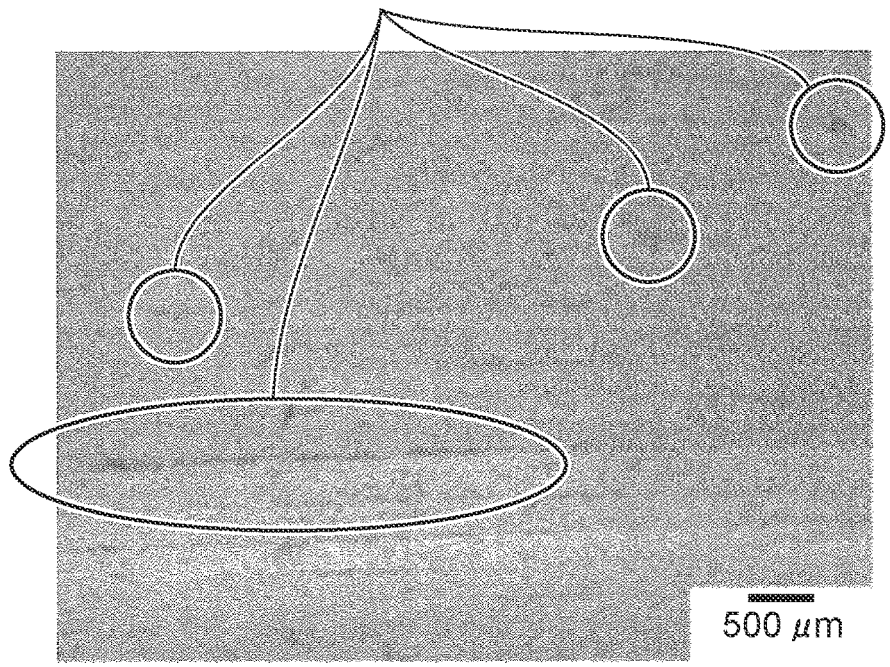
FIG. 8B is a picture of a section of a tubular compact according to a comparative example in a direction perpendicular to an axial center.

A section of the tubular compact thus obtained was observed by an optical microscope. A result thereof is shown in FIG. 8B. FIG. 8B is a picture of a section of the tubular compact according to the comparative example in a direction perpendicular to its axial center.

Result

As illustrated in FIGS. 8A, 8B, no void occurred in the tubular compact of the example, whereas voids occurred in the tubular compact of the comparative example. This is because the tubular compact was formed by hoop winding by the sheet winding method in the example, as having been described in the present embodiment.

Thus, the examples of the exemplary embodiments have been described, but the exemplary embodiments are not limited to the above embodiments. Even if there are changes in design within a range that does not deviate from a gist of the examples provided herein, they are included in the exemplary embodiments.

What is claimed is:

1. A manufacturing method of a tank including a tubular body portion, and dome-shaped side end portions formed on both sides of the body portion, the manufacturing method comprising:
    impregnating reinforced fibers with a thermoplastic resin to obtain a fiber-reinforced resin sheet,
    heating the fiber reinforced resin sheet impregnated with the thermoplastic resin at a temperature of a softening point of the thermoplastic resin or higher to melt the thermoplastic resin,
    winding the fiber reinforced resin sheet, in a state where the thermoplastic resin is melted, several times around a peripheral surface of a cylindrical core or a liner in a direction perpendicular to an axial center of the core to form a tubular compact serving as at least part of the body portion, and heating is not carried out at the cylindrical core, and
    forming the side end portions in the tank by heating dome-shaped side end members and the tubular compact so that the side end members are fused to the tubular compact,
    the side end members containing the thermoplastic resin as a main material, and
    a width of the fiber reinforced resin sheet is larger than a length of the core or a length of the liner.

2. The manufacturing method according to claim 1, wherein:
    reinforced fibers are arranged along one direction in the fiber reinforced resin sheet; and
    when the tubular compact is formed, the fiber reinforced resin sheet is wound around the peripheral surface of the core or the liner so that the reinforced fibers are wound several times on a section perpendicular to the axial center of the core or the liner.

3. The manufacturing method according to claim 1, wherein
    after the tubular compact is formed, the fiber reinforced resin sheet is wound around the peripheral surface of the core, and the tubular compact is pulled out from the core, so as to manufacture a body corresponding to the body portion.

4. The manufacturing method according to claim 1, wherein the fiber reinforced resin sheet is wound around the peripheral surface of the cylindrical core or the liner, the thermoplastic resin is forced cooled to a temperature lower than the softening point to harden.

* * * * *